United States Patent
Liu et al.

(10) Patent No.: US 10,962,651 B2
(45) Date of Patent: Mar. 30, 2021

(54) IONOSPHERIC DELAY CORRECTION METHOD FOR LEO SATELLITE AUGMENTED NAVIGATION SYSTEMS

(71) Applicant: Wuhan University, Hubei (CN)

(72) Inventors: Jingbin Liu, Hubei (CN); Ruizhi Chen, Hubei (CN); Deren Li, Hubei (CN); Liang Chen, Hubei (CN); Lei Wang, Hubei (CN); Shulun Liu, Hubei (CN)

(73) Assignee: Wuhan University, Hubei (CN)

( * ) Notice: Subject to any disclaimer, the term of this patent is extended or adjusted under 35 U.S.C. 154(b) by 191 days.

(21) Appl. No.: 16/094,417

(22) PCT Filed: Oct. 30, 2017

(86) PCT No.: PCT/CN2017/108244
§ 371 (c)(1),
(2) Date: Oct. 17, 2018

(87) PCT Pub. No.: WO2019/015160
PCT Pub. Date: Jan. 24, 2019

(65) Prior Publication Data
US 2019/0271782 A1 Sep. 5, 2019

(30) Foreign Application Priority Data

Jul. 18, 2017 (CN) .......................... 201710587102.1

(51) Int. Cl.
*G01S 19/07* (2010.01)
*G01S 19/40* (2010.01)
*G01S 19/03* (2010.01)

(52) U.S. Cl.
CPC ............ *G01S 19/07* (2013.01); *G01S 19/072* (2019.08); *G01S 19/40* (2013.01); *G01S 19/03* (2013.01)

(58) Field of Classification Search
CPC .......... G01S 19/07; G01S 19/03; G01S 19/40; G01S 19/072
(Continued)

(56) References Cited

U.S. PATENT DOCUMENTS

| 5,812,961 A | * | 9/1998 | Enge | ....................... G01S 19/04 |
| | | | | 342/357.44 |
| 5,944,770 A | * | 8/1999 | Enge | ....................... G01S 19/04 |
| | | | | 342/357.44 |

(Continued)

FOREIGN PATENT DOCUMENTS

| CN | 106134461 B | 5/2014 |
| CN | 105022045 A | 11/2015 |

(Continued)

*Primary Examiner* — Chuong P Nguyen
(74) *Attorney, Agent, or Firm* — Novick, Kim & Lee, PLLC; Allen Xue

(57) ABSTRACT

The invention discloses an ionospheric delay correction method for LEO satellite augmented navigation systems for GNSS. According to the method, GNSS satellite navigation signals received by LEO GNSS receiver loads are used for providing ionospheric information for navigation augmentation for earth surface users. In the method, as a set of mobile navigation augmentation reference stations, LEO satellites continuously observe the global ionosphere to generate ionospheric delay correction information, and the ionospheric delay correction information is sent to the earth surface users to obtain augmented navigation performance. By adoption of the method, ionospheric delay correction data covering the whole world instead of covering certain areas and particularly ionospheric delay correction data covering the vast marine areas are obtained; ionospheric gradient data are provided; and compared with traditional approaches, ionospheric delay correction accuracy is higher than that of traditional approaches; ionospheric activities (Continued)

and events are monitored in orbit to provide complete ionospheric delay correction information.

9 Claims, 2 Drawing Sheets

(58) Field of Classification Search
USPC .................................... 342/357.23, 357.44
See application file for complete search history.

(56) References Cited

U.S. PATENT DOCUMENTS

| | | | | |
|---|---|---|---|---|
| 6,683,563 B2* | 1/2004 | Lee | ............... | B64G 1/36 |
| | | | | 342/357.395 |
| 7,840,351 B2* | 11/2010 | Hwang | ............... | G01S 19/07 |
| | | | | 701/478.5 |
| 8,260,551 B2* | 9/2012 | Janky | ............... | G01S 19/40 |
| | | | | 701/469 |
| 8,723,725 B2* | 5/2014 | Zhao | ............... | G01S 19/40 |
| | | | | 342/357.23 |
| 9,121,932 B2* | 9/2015 | Janky | ............... | G01S 19/40 |
| 9,170,335 B2* | 10/2015 | Chen | ............... | G01S 19/07 |
| 10,338,227 B2* | 7/2019 | Chen | ............... | G01S 19/43 |
| 2009/0091493 A1* | 4/2009 | Hwang | ............... | G01S 19/07 |
| | | | | 342/357.44 |
| 2013/0332072 A1* | 12/2013 | Janky | ............... | G01S 19/07 |
| | | | | 701/469 |
| 2016/0327686 A1 | 11/2016 | Martin-Neira | | |

FOREIGN PATENT DOCUMENTS

| | | |
|---|---|---|
| CN | 105891856 A | 8/2016 |
| CN | 106772445 A | 5/2017 |
| WO | 2008016914 A3 | 10/2008 |

* cited by examiner

IONOSPHERIC DELAY CORRECTION METHOD FOR LEO SATELLITE AUGMENTED NAVIGATION SYSTEMS

BACKGROUND OF THE INVENTION

Technical Field

The invention belongs to the technical field of the next generation of satellite positioning and navigation augmentation, and particularly relates to an ionospheric delay correction method for LEO satellite augmented navigation systems.

Description of Related Art

The ionosphere is a partially ionized atmosphere which is about 60-1000 km above the ground. Under the effect of solar ultraviolet, X-rays, high-energy particles and other cosmic rays, atmospheric molecules or atoms in the ionosphere are ionized to generate a large quantity of free electrons and positive and negative ions, which are important constituent parts of the sun-earth space environment. As a propagation medium, the ionosphere may reflect, refract, scatter and absorb radio waves at different wave bands, thus affecting communication and broadcast to a certain extent. In the present era during which global navigation satellite systems have rapidly developed, effective monitoring and prediction of ionospheric activities are of important significance for discovering the activity rule of the ionosphere and for improving navigation and positioning accuracy for satellite navigation users.

GNSS navigation signal delay caused by the ionosphere may reach several meters and even hundreds of meters, which affects the application mode and service scope of navigation systems and continuously promotes intensive study on the ionosphere. Since the construction of the Doppler satellite navigation system by America in 1950s, all the countries in the world are actively establishing and developing respective satellite navigation systems. Nowadays, satellite navigation systems, including fully deployed ones like American Global Positioning System (GPS) and Russian Global Navigation Satellite System (GLONASS), and those under construction like European Union's Galileo and Chinese Beidou Navigation Satellite System (BDS), greatly increase the number of visible satellites and continuously operating GNSS observation stations, thus, providing unprecedented data resources for relevant study on high-precision and high-resolution continuous monitoring of the ionosphere. At present, all countries possessing GNSSs are speeding up improvement and upgrading of the systems in the aspects of improving navigation and positioning precision and navigation service level. Full consideration of all aspects of system construction and improvement is required, and the technical indexes and performance for ionosphere monitoring and correction need to be improved to the maximum extent. For this reason, accurate correction of ionospheric delay errors is always a hot topic in satellite navigation study and application.

In GNSS measurement, ionospheric delay correction methods adopted by single-frequency GNSS receiver users are mainly based on ionospheric theoretical models, empirical models and ionospheric measurement models established based on GNSS measured data. Double-frequency or multi-frequency GNSS receiver users may solve ionospheric delay based on ionospheric delay-free linear combination observations consisting of double-frequency or multi-frequency data, but the delay bias of signals in satellites has to be taken into consideration.

Common theoretical models include the Global Theoretical Ionospheric Model (GTIM), Field Line Inter-hemispheric Plasma Model (FLIP), Sheffield University Plasmasphere-Ionospheric Model (SUPIM), Time-dependent Ionospheric Model (TDIM), SAMI2 and the like, wherein certain models take empirical neutral atmosphere models such as Mass Spectrometer Incoherent Scatter Model (MSIS) and Horizontal Wind Model (HWM) as input, or determine the neutral atmosphere density and neutral wind based on observational data. These regional models mainly cover low-latitude and mid-latitude regions. There are also global ionospheric empirical models such as National Center for Atmospheric Research (NCAR), Thermosphere Ionosphere General Circulation Model (TIGCM) and Coupled Thermosphere Ionospheric model (CTIM) which determine components of the neutral atmosphere and dynamic elements by solving neutral atmosphere equations and couple the ionosphere dynamic part and the neutral atmosphere dynamic part inside the models. Although theoretical models are beneficial for observing relative influences and possible changes of various input physical parameters, the theoretical models are too complex to be directly applied by GNSS users.

As a widely applied ionosphere expression approach, empirical models allow people to describe continuous changes of ionospheric parameters by modeling a series of observation data discrete in time and space. Common empirical models include the International Reference Ionospheric Model (IRI), Bent Model, NeQuik Model, Klobuchar Model and the like. Although empirical models are simpler than theoretical models, the accuracy of the empirical models cannot be ensured in all regions of the world, and for users with high-precision positioning requirements and users in special regions, it is inadvisable to realize ionospheric correction only through empirical models.

Global VTEC models constructed based on measured data mainly include VTEC Grid Ionospheric TEC Map (GIM) provided by IGS and Spherical Harmonics Model provided by CODE. IGS obtains a final ionospheric TEC grid by weighted averaging of ionospheric TEC grids provided by all analysis centers, and then users obtain the VTEC value of a certain place at a certain time through interpolation of time, longitude and altitude. CODE constructs the global VTEC model in a 15-order and 15-time spherical harmonics form based on GNSS observation data on ground tracking stations, and coefficients of the spherical harmonics model in 3 days can be synchronously estimated through least-square global estimation. Regional VTEC models are mostly surface fitting models, grid models constructed through the distance weighting method and VTEC models constructed based on multi-surface functions, and the modeling precision is basically identical. Although the measurement models can better reflect the actual condition of the ionosphere than the empirical models, they are also based on observation data from the ground tracking stations and thus are limited by the distribution condition of the tracking stations. Due to the deficiency or even absence of observation stations in ocean and desert regions, the accuracy of measurement models in these regions is not ideal and consequentially cannot meet requirements of all users.

In order to improve the accuracy and reliability of GNSS navigation and positioning to meet the requirement for real-time high-precision navigation and positioning, GNSS positioning error correction coefficients to be provided for terminal users need to be generated by augmentation systems. According to the correction coefficient broadcasting mode, the augmentation systems are classified as ground-based augmentation systems (GBAS) and satellite-based augmentation systems (SBAS). According to the correction coefficient coverage, the augmentation systems are classified as local-area augmentation systems and wide-area augmentation systems. As for GBAS and SBAS, continuously operating reference stations need to be constructed on the ground, where ionospheric delay correction parameters in the coverage area are calculated according to GNSS data obtained by these ground reference stations, and are then sent to GNSS users through communication links. These error correction parameters are applied to the GNSS positioning calculation process at the client-side so as to improve positioning accuracy. The difference between GBAS and SBAS lies in that GBAS adopts ground communication transmission links such as radio stations, internets or the like; however, as for SBAS, ionospheric delay correction parameters worked out by ground data processing centers need to be uploaded to geosynchronous orbit satellites which in turn send the ionospheric delay correction parameters to ground users. Both GBAS and SBAS depend on a certain number of ground reference stations as well as corresponding infrastructure and communication facilities and consume a large quantity of human and material resources for operation and maintenance.

GBAS includes American CORS system, European EPN system, German SAPOS system, Japanese GeoNet system and Chinese Beidou Ground-based Augmentation System under construction. A ground-based augmentation differential system is composed of a continuously operating reference station network, a system control and data center, a data communication network, a user application subsystem and the like. A reference station subsystem is mainly composed of antennas, receivers, communication devices, power supply devices, arrester devices, meteorological devices, observation rooms and the like. SBAS is also called wide-area augmentation system and includes the American WAAS, European EGNOS, Japanese MSAS, Indian GAGAN and the like. As for SBAS, ground reference stations are arranged within a wide range to calculate augmentation correction signals, and the positioning accuracy is improved for ground GNSS users through augmentation signals broadcast by geosynchronous earth orbit satellites. As the continuously operating reference stations (CORSs) used as reference stations cannot be constructed in air or on the sea, the ground local-area differential technique is not suitable for large-scale applications such as aerospace applications and marine applications, and only satellite-based wide-area augmentation systems can be used on these occasions to improve performance for GNSS users. Both GBAS and SBAS rely on the continuously operating reference stations on the ground and consume a large quantity of manpower and material resources for operation and maintenance.

BRIEF SUMMARY OF THE INVENTION

To solve the above-mentioned problems, the invention provides an ionospheric delay correction method for LEO satellite augmented navigation systems. According to the ionospheric delay correction method for LEO satellite augmented navigation systems, with an LEO spacecraft as a motion carrier platform, the earth ionosphere is continuously observed by loads carried by the LEO platform to obtain electron density distribution of the ionosphere, so that ionospheric delay correction parameter information is provided for satellite navigation system users to improve the accuracy, reliability and comprehensiveness of satellite navigation and positioning.

Furthermore, LEO spacecraft motion carriers include artificial satellites operating on low earth orbits and other unmanned motion carriers operating on orbits below 2000 km above the ground.

Furthermore, the earth ionosphere observation loads include satellite navigation receivers and other devices used for observing the electron quantity, electron temperature, electron density, collision frequency, ion temperature, ion density, ion element electricity and ionospheric physical parameters of the earth ionosphere.

Furthermore, the ionospheric delay correction method for LEO satellite augmented navigation systems specifically includes the following steps:

Step 1, a set of LEO satellites are launched, and double-frequency or multi-frequency signals of GNSS satellites are received by GNSS receivers carried by the LEO satellites;

Step 2, the CNSS receivers carried by the LEO satellites determine the positions of the LEO satellites, and then orbit parameters of the LEO satellites are determined based on the positions of the LEO satellites;

Step 3, the electron content of a signal propagation path is determined by means of the double-frequency or multi-frequency signals received by the GNSS receivers carried by the LEO satellites;

Step 4, electron content distribution of the ionosphere in an area or in a global scope is determined by means of the double-frequency or multi-frequency signals received by the GNSS receivers carried by the LEO satellites according to operating orbits of the LEO satellites;

Step 5, an electron content gradient of the ionosphere in the area or the global scope is determined by means of the double-frequency or multi-frequency signals received by the GNSS receivers carried by the LEO satellites according to the operating orbits of the LEO satellites, so that spatial distribution of electron content changes of the ionosphere is obtained;

Step 6, the occurrence of ionospheric events is monitored by means of the double-frequency or multi-frequency signals received by the GNSS receivers carried by the LEO satellites according to the operating orbits of the LEO satellites; when the ionospheric events occur, parameters such as occurrence time, position and amplitude of the ionospheric events will be calculated;

Step 7, a proper ionospheric model is established based on ionospheric data calculated in steps 3-6, and ionospheric delay correction parameters of any position on the earth surface are calculated through the ionospheric model, wherein Step 7 is completed on the LEO satellites; or, relevant data are transmitted to earth stations to complete Step 7 on earth station computers;

Step 8, the ionospheric model calculated in Step 7 is sent to GNSS receivers of earth surface users, and the ionospheric model outputs a corresponding ionospheric delay correction parameter after rough positions of the users, times and satellite positions are input to the ionospheric model;

Step 9, ionospheric delay correction parameters of all the satellites are calculated according to Step 8, and ionospheric delay errors in observation signals are corrected in a GNSS positioning mathematic model to obtain an improved positioning result.

Furthermore, a GNSS system includes the Chinese Beidou Navigation System, American GPS, Russian GLONASS, European Galileo Navigation System, or any combination of two or more of Chinese Beidou Navigation System, American GPS, Russian GLONAS and European Galileo Navigation System.

Furthermore, Step 3 specifically includes the following sub-steps: the GNSS satellite navigation receivers are carried by LEO spacecrafts to receive satellite navigation and positioning signals to further determine the positions of the LEO satellites, the electron content of the ionosphere is calculated by means of observations from the navigation receivers, ionospheric delay correction parameters at the positions of other GNSS users are calculated according to electron contents at the positions of the receivers, and the calculated delay correction parameters are used to determine the positions of the GNSS users;

Furthermore, Step 5 specifically includes the sub-Step that electron contents of the spacecrafts at different positions are calculated by means of observations from the GNSS satellite navigation receivers carried by the LEO spacecrafts, and then an electron content change gradient of the ionosphere in the three-dimensional space is calculated.

Furthermore, Step 7 specifically includes the sub-Step that the electron contents of the spacecrafts at different positions are calculated by means of the observations from the GNSS satellite navigation receivers carried by the LEO spacecrafts, and then an ionospheric electron content model used for calculating the ionospheric delay correction parameters at the positions of other GNSS users is established.

Furthermore, Step 8 specifically includes the sub-step that ionospheric delay correction parameters at the user position are calculated by computers carried by the LEO spacecrafts, and the ionospheric delay correction parameters at the positions of other GNSS users including earth surface users are calculated according to the observations from the LEO spacecrafts.

Furthermore, Step 9 specifically includes the sub-Step that ionospheric delay correction parameters at the user position are calculated at a data computing center, the observations obtained by the LEO spacecrafts are sent to the data computing center, and the ionospheric delay correction parameters at the positions of other GNSS users including the earth surface users are calculated by the data computing center.

Furthermore, ionospheric physical parameters observed by LEO spacecraft carried devices, which include GNSS receivers, ionosondes and topside ionosphere/plasmasphere sounders, are used to determine the occurrence of ionospheric events like topside ionospheric variations, ionospheric flickers, magnetic storms, ionospheric storms, proton storms and travelling ionospheric disturbance.

The invention has the following beneficial effects:

1) Wide-area coverage within the global range is achieved, specifically, an LEO satellite constellation is used as a mobile base station, so that the ionosphere in the global range or a wide area can be observed continuously without being restrained by earth land coverage or ground infrastructure, a unified ionospheric correction augmentation service is truly provided within a wide area and even within the global range including oceans, deserts, mountainous regions and other areas beyond the coverage of ground-based augmentation systems.

2) The system cost is low, specifically, a wide area or the global range can be covered with few satellites and ionospheric observation loads, and required ground infrastructure construction is reduced through a wireless satellite communication method, so that the system cost is reduced in these two aspects, automatic observation and data processing in a wide area or in the global range are achieved through the unified system, a unified navigation and positioning augmentation service is provided, and the overall system cost is reduced.

3) The ionospheric state is observed and monitored comprehensively, specifically, similar to the ground-based augmentation systems, the electron content of the ionosphere is observed through the GNSS receivers carried by the LEO satellites, and gradient distribution of the electron content of the ionosphere in the coverage is calculated based on the rapid movement characteristic of the LEO satellites serving as a mobile station.

4) The operating orbits of the LEO satellites are located within the altitude range of the ionosphere, ionospheric events are monitored in real time through ionospheric state monitoring devices carried on the LEO satellites, the user receivers perform adaptive processing in the aspects of GNSS signal tracking, digital signal processing and positioning calculation based on the events, and thus the positioning accuracy and reliability are improved for the GNSS users.

DETAILED DESCRIPTION OF THE INVENTION

To make the purpose, technical scheme and advantages of the invention clearer and more understandable, a further detailed description of the invention is given as follows in combination with the drawings and embodiments. It can be appreciated that the specific embodiment in the following description is only used for explaining the invention and is not used for limiting the invention. On the contrary, the invention includes all substitutes, modifications and equivalent methods and schemes defined by the claims and based on the spirit and scope of the invention. Furthermore, in order to make the general public better understand the invention, certain detailed parts of the invention are described in detail as follows. Those skilled in the field can still completely understand the invention without a description of these detailed parts.

Figure 1:
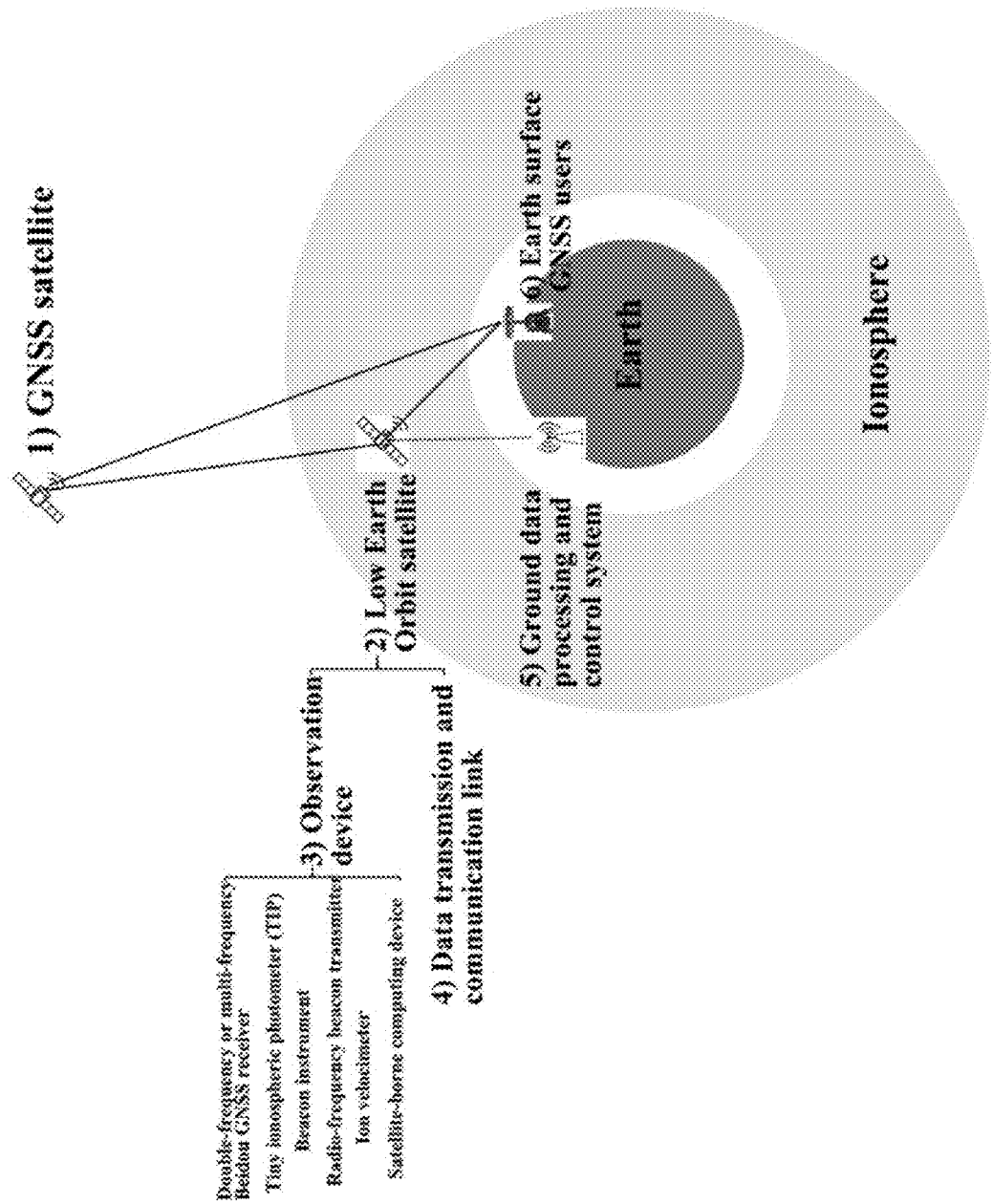
FIG. 1 is a structural view of an ionospheric delay parameter correction method for LEO satellite augmented navigation systems of the invention.

The invention is further described as follows in combination with the drawings and specific embodiment; however, the invention is not limited to the following specific embodiment. The optimal embodiment of the invention is given as follows:

As shown in FIG. 1, a system used by a method of the invention includes (1) GNSS satellite constellations, (2) LEO satellite constellations, (3) instruments carried by LEO satellites, (4) data transmission communication links carried by the LEO satellites, (5) a ground augmentation data processing system, and (6) earth surface GNSS users. Next, each constituent part of this system is introduced briefly. (1) The GNSS satellite constellations include American GPS, Russian GLONASS, European Union's Galileo under construction, Chinese Beidou navigation and positioning system under construction and the like. These satellite constellations are mainly composed of MEO satellites, GEO satellites and IGSO satellites which operate on high satellite orbits and are located in the magnetosphere. (2) The flight orbits of the LEO satellite constellations are required to be located in the ionosphere. (3) The instruments carried by the LEO satellites mainly include double-frequency or multi-frequency GNSS receivers, tiny ionosphere photometers (TIP), beacon instruments, radio-frequency beacon transmitters, ion speedometers, satellite-borne computing devices and the like. Wherein, the double-frequency or multi-frequency GNSS receivers are used for accurate positioning and orbit determination of fixed-orbit satellites and measurement of the electron content of the ionosphere. The tiny ionosphere photometers are used for calculating the total electron density from the satellites to the earth. The beacon instruments are used for transmitting electromagnetic signals through radio transmitters, and after the electromagnetic signals are analyzed by receiving stations distributed everywhere, a high-resolution electron density field and the total electron content (TEC) at an altitude over the ionosphere are calculated. The radio-frequency beacon transmitters and the ion velocimeters are used for providing richer ionosphere parameters to better monitor detail changes and special phenomena of the ionosphere. The satellite-borne computing devices have a sufficient data recording capacity and a powerful preprocessing and processing function and can transmit observation data and calculation data to ground computing centers and ground users periodically or in real time. (4) The data transmission communication links carried by the LEO satellites are used for transmitting observation data and calculation data of the LEO satellites to the ground computing centers or the ground GNSS users (according to the fact whether navigation augmentation data are processed by satellite computers or ground data processing systems). (5) The ground augmentation data processing systems receive and process the observation data from the LEO satellites, generate ionospheric correction parameter data for navigation augmentation and send augmentation data to the GNSS users through communication systems. (6) The earth surface GNSS users include timed-authorized users possessing single-frequency, double-frequency or multi-frequency GNSS receivers for GNSS navigation and positioning.

Figure 2:
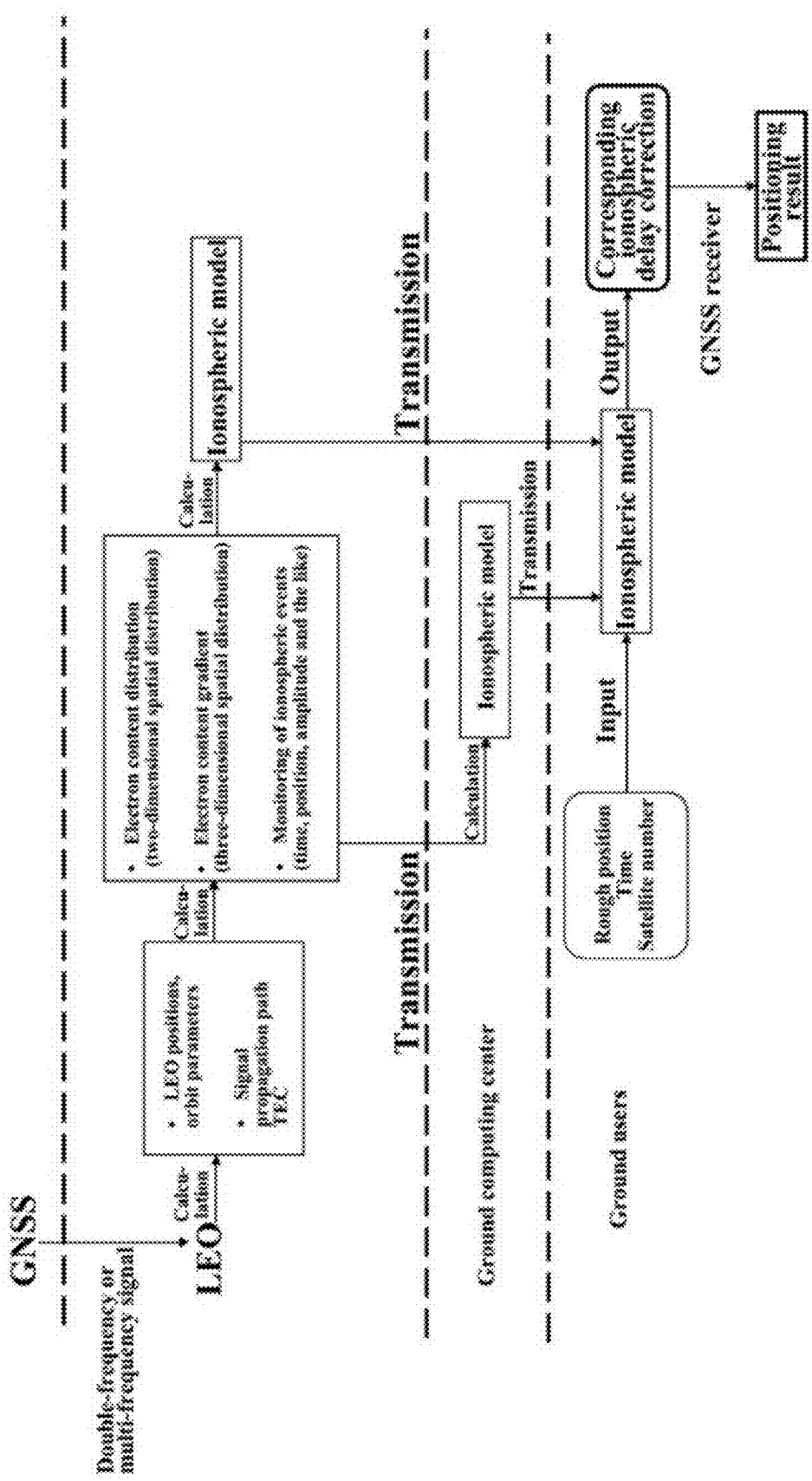
FIG. 2 is a flow diagram of an ionospheric delay parameter correction method for LEO satellite augmented navigation systems of the invention.

As shown in FIG. 2, the invention provides an ionospheric delay parameter correction method for LEO satellite augmented navigation systems. The ionospheric delay parameter correction method for LEO satellite augmented navigation systems includes the following steps: 1) a set of LEO satellites carrying double-frequency or multi-frequency GNSS receivers and other ionosphere observation instruments are launched first, the GNSS receivers carried by the LEO satellites receive GNSS satellite signals to determine the positions of the LEO satellites, and then the orbit parameters of the LEO satellites are determined according to the positions of the LEO satellites; the TEC of a signal propagation path is worked out by means of double-frequency or multi-frequency data; 2) regional or global electron content distribution (two-dimensional spatial distribution) and electron content gradient (three-dimensional spatial distribution of electron content variations) of the ionosphere are determined according to operating orbits of the LEO satellites and the TEC of the signal propagation path; 3) the occurrence of ionospheric events are monitored by the beacon instruments and other ionosphere physical observation devices according to the TEC observed by GNSS; when the ionospheric events occur, parameters including occurrence time, position and amplitude will be calculated; a proper ionospheric model is established based on data such as the TEC, the regional or global electron content gradient and the event of the ionosphere, ionospheric delay correction parameters of any position on the earth surface is calculated through the model (this Step is completed on the LEO satellites, or relevant data is transmitted to ground stations to complete this Step on ground station computers); the LEO satellites or the ground computing centers send the ionospheric model to the GNSS receivers of earth surface users, and the model outputs corresponding ionospheric delay correction parameters after the users input rough positions, times and satellite positions to the ionospheric model; ionospheric delay correction parameters from all the satellites to the users are obtained through calculation; ionospheric delay errors in observation signals are corrected in a GNSS positioning mathematical model to obtain an improved positioning result.

The above embodiment is only a preferred specific embodiment of the invention. All common changes and substitutes made by those skilled in this field should fall within the protection scope of the invention.

What is claimed is:

1. An ionospheric delay correction method for low earth orbit (LEO) satellite augmented navigation systems, comprising:
    Step 1: launching at least one LEO satellite, receiving double-frequency or multi-frequency signals from a Global Navigation Satellite System (GNSS) system using a GNSS receiver carried by the at least one LEO satellite;
    Step 2: determining a position of the at least one LEO satellite, and then determining an orbit parameter of the at least one LEO satellite based on a location of the at least one LEO satellite;
    Step 3: determining electron content of a signal propagation path based on the double-frequency or multi-frequency signals received by the GNSS receiver;
    Step 4: determining a regional or global electron content distribution of an ionosphere layer based on the double-frequency or multi-frequency signals received by the GNSS receiver;
    Step 5: determining a regional or global electron content gradient of the ionosphere, based on the double-frequency or multi-frequency signals received by the GNSS receiver to obtain a spatial distribution of electron content in the ionosphere layer;
    Step 6: monitoring an ionospheric event based on double-frequency or multi-frequency signals, and calculating the parameters comprising a time, a position, and an amplitude of the ionospheric event;
    Step 7: establishing an ionospheric model according to ionospheric data calculated according to Steps 3-6;
    Step 8: transmitting the ionospheric model obtained in Step 7 to a surface GNSS receiver disposed on an earth surface,
    inputting the position, the time, and the amplitude of the ionospheric event, and the position of the at least one satellite into the ionospheric model, and
    outputting a corresponding ionospheric delay correction parameter; and
    Step 9: calculating the ionospheric delay correction parameter for each of the at least one LEO satellite according to Steps 1-8 when there are more than one LEO satellites, and correcting an ionospheric delay error in observation signals using a GNSS positioning mathematical model to obtain an improved positioning result.

2. The method according to claim 1, wherein the at least one LEO satellite operates on an orbit less than 2000 km above the earth surface.

3. The method according to claim 1, wherein instruments carried by the LEO satellite further comprises a tiny ionosphere photometer (TIP), a beacon instrument, a radio-frequency beacon transmitter, an ion speedometer, a satellite-borne computing device.

4. The method according to claim 1, wherein a GNSS system is selected from Chinese Beidou navigation system, American GPS, Russian GLONASS, and European Galileo navigation system.

5. The method according to claim 1, wherein the ionosphere layer is three dimensional, and the spatial distribution of electron content shows an electron content gradient in the ionosphere in a three-dimensional ionosphere layer.

6. The method according to claim 1, wherein more than one LEO satellites are positioned at a plurality of positions.

7. The method according to claim 1, wherein the calculation of the ionospheric delay correction parameter is carried out at the surface GNSS receiver location or on the at least one LEO satellite.

8. The method according to claim 1, wherein a plurality of GNSS receivers are disposed on the earth surface, and wherein data from the at least one LEO satellite and the plurality of GNSS receivers are sent to a data computer center for processing.

9. The method according to claim 1, wherein the at least one LEO satellite carries instruments including an ionosonde, a topside ionosphere/plasmasphere sounder in addition to the GNSS receiver, wherein the instruments monitor ionospheric events selected from topside ionospheric changes, ionospheric flickers, magnetic storms, ionospheric storms, proton storms, and travelling ionospheric disturbance.

* * * * *